United States Patent [19] [11] 3,890,555
Nelson et al. [45] June 17, 1975

[54] BATTERY RECHARGING CIRCUIT WITH INDICATOR LIGHTS

[75] Inventors: Norman C. Nelson, New Berry Springs; Daniel C. Harley, Apple Valley, both of Calif.

[73] Assignee: Kel-Lite Industries, Inc., Barstow, Calif.

[22] Filed: Sept. 6, 1973

[21] Appl. No.: 394,746

[52] U.S. Cl. ............... 320/2; 240/10.6 CH; 320/48
[51] Int. Cl. ........................... H02j 7/02; F211 9/00
[58] Field of Search ....... 320/2, 3, 48; 240/10.6 CH; 340/248, 249; 307/66

[56] References Cited
UNITED STATES PATENTS
3,441,829 4/1969 Perkins et al. ................ 307/66 UX
3,534,354 10/1970 Galginaitis ...................... 320/48 X
3,564,382 2/1971 King et al. ...................... 320/48 X FOREIGN PATENTS OR APPLICATIONS
378,516 8/1932 United Kingdom ................. 320/48

*Primary Examiner* — J. D. Miller
*Assistant Examiner* — Robert J. Hickey

[57] ABSTRACT

A charge control diode is coupled in series with a regulated DC voltage source in order to insure that current flows in proper polarity into the battery being charged and does not return to the source. An indicator circuit is coupled across the charge control diode for indicating both a "charge" condition and a "power off" condition. The indicator circuit includes a pair of cross-coupled transistors having a common current limiter, and a separate light-emitting diode connected in series with the collector-emitter current path of each transistor. When a "POWER OFF" condition occurs one of the transistors is biased to a conductive state and current then flows through it and its associated light-emitting diode from the battery that was to have been charged.

3 Claims, 2 Drawing Figures

BATTERY RECHARGING CIRCUIT WITH INDICATOR LIGHTS

BACKGROUND OF THE INVENTION

In battery recharging circuits it has been conventional to employ an indicator light for indicating when a charging current is flowing into the battery. If for any reason a charging current is not flowing then the indicator light is not lighted. The fact that the indicator light is not lighted would indicate either that no charging current is flowing into the battery or that the indicator light bulb has burned out.

The foregoing type of operation is conventional and is considered satisfactory for most purposes.

The novel recharger circuit of the present invention has been devised specifically for use as a flashlight recharger, and possesses novel characteristics whose value may perhaps be limited to that particular application.

According to the present invention a battery recharger is provided with a pair of indicator lights, one to indicate that a charging action is taking place and the other to indicate that a power failure has occurred. The light indicating a power failure is energized by drawing current from the battery that was to have been charged.

DRAWING SUMMARY

PREFERRED EMBODIMENT

Figure 1:
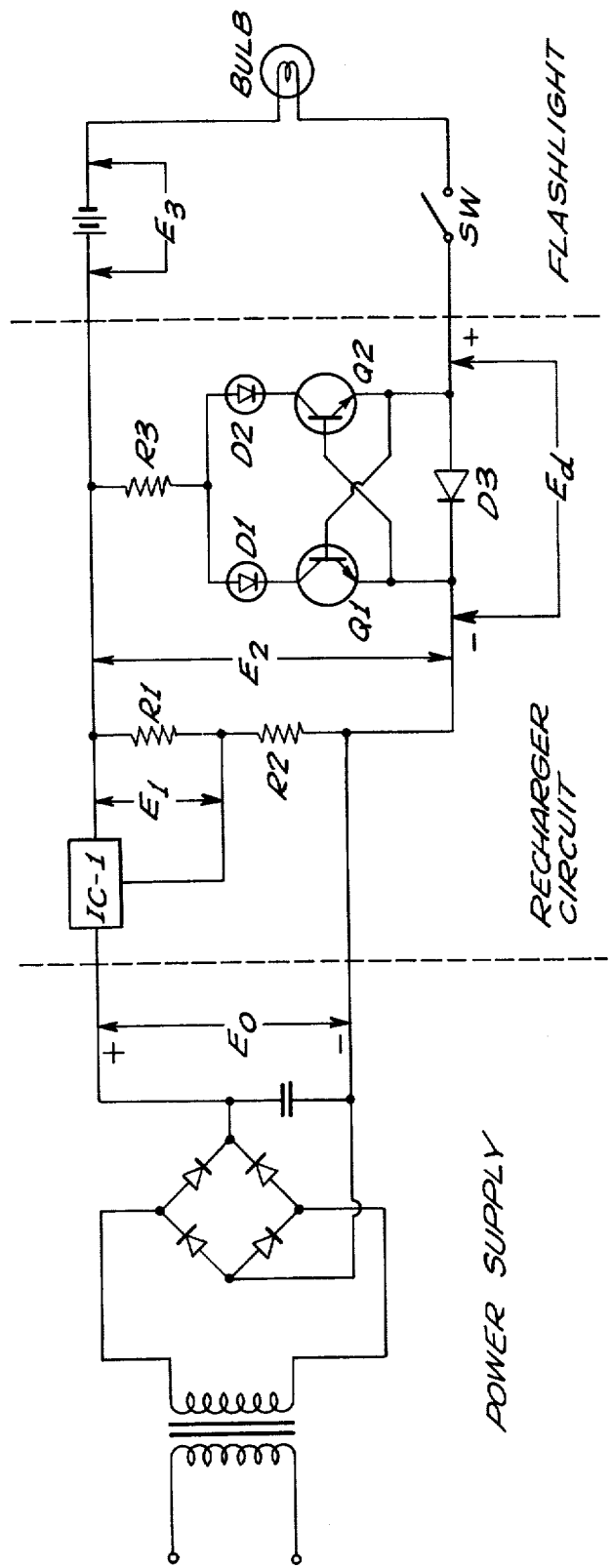
FIG. 1 is a schematic diagram of the recharger circuit of the present invention when connected to a flashlight.
Figure 2:
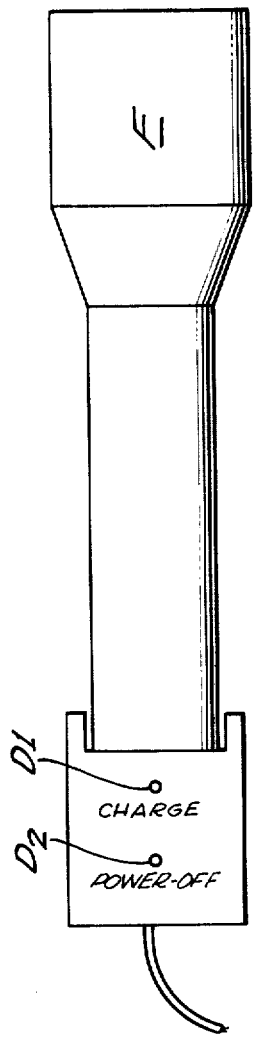
FIG. 2 is an elevation view of the flashlight and charger, showing the location of the indicator lights.

Reference is now made to the drawing, FIGS. 1 and 2, illustrating the presently preferred embodiment of the invention.

FIG. 2 illustrates in an outline form only, the mechanical arrangement of the flashlight F and a recharger H & R in accordance with the invention. The mechanical arrangement of both the flashlight and the recharger are shown in greater detail in copending application Ser. No. 386,367, filed Aug. 7, 1973 and copending application Ser. No. 386,366, filed Aug. 7, 1973, both of which are assigned to the same assignee as the present application.

As shown in FIG. 1 a Power Supply provides a DC output voltage $E_o$ typically having a value of about 12 volts. An A.C. input is illustrated, which may be used in the event that connection to a standard 110 volt A.C. outlet is desired. On the other hand, the voltage $E_o$ may be obtained in a vehicle by direct connection to the vehicle battery, or to the generator output.

The Recharger Circuit includes a regulated DC voltage source comprising the elements IC-1, R1, and R2. The element IC-1 is an integrated circuit which is constructed as a voltage regulator and produces a standard no-load voltage $E_1$ across its output terminals. The input of IC-1 is connected to the positive $E_o$ terminal. Resistor R1 is connected across the outputs of IC-1. A resistor R2 is connected in series with R1 and has its remote end connected to the negative output of the $E_o$ source.

A typical value of the regulator voltage $E_1$ is 5 volts and the relative values of R1 and R2 are so selected that the typical value of no-load voltage $E_2$ appearing across the series combination or R1 and R2 may be about 6.90 volts. Thus the purpose of IC-1, R1, and R2 is to collectively provide a regulated DC voltage source having a no-load output voltage $E_2$ which may typically be 6.90 volts.

Also included in the Recharger Circuit is a charge control diode D3. Diode D3 is coupled in series with the source $E_2$ to form a series circuit extending between the terminals X—X.

A battery which is to be charged has a voltage across its terminals identified as $E_3$. The battery is presently illustrated as being a part of a flashlight circuit. The flashlight includes an on-off switch SW and a Bulb. The battery $E_3$, the Bulb, and switch SW are connected in a series loop.

During normal use of the flashlight its circuit is of course closed, except for the switch SW. Closing of the switch SW causes current to flow through the Bulb and hence provide illumination. When battery $E_3$ is to be recharged, however, it is necessary to open up the circuit between the battery and the switch. Suitable mechanisms for that purpose are disclosed in our prior copending applications referred to above.

Thus the flashlight circuit, when opened up, is connected to terminals X—X of the recharger. Switch SW of the flashlight must then be closed in order for charging action to occur. The battery $E_3$ is of course coupled to the recharger circuit in a polarity which opposes the polarity of the voltage source $E_2$. Charging current flows into the battery $E_3$ and also flows through the Bulb and through switch SW and through the charger control diode D3. Diode D3 prevents the flow of current in the wrong direction back to the source $E_2$.

Battery $E_3$ may typically consist of three cells each having a nominal fully charged voltage of 2.05 volts, for example. In the event that the battery cells are badly in need of charging there will be an initial rush of current to the battery when the recharger circuit is connected to it. However, the voltage regulator IC-1 is limited to the amount of current it can supply, the maximum available current being typically about 4.0 amperes. The Bulb serves to limit the initial heavy transient of current. The charging current diminishes rapidly and energy consumed by the Bulb is then nominal.

The Recharger Circuit also includes a circuit for indicating the charging condition. The indicator circuit includes a resistor R3, light-emitting diodes D1 and D2, and transistors Q1 and Q2. Resistor R3 has one end connected to the positive X terminal. Both the diodes D1 and D2 have their anodes connected to the other end of R3. The cathode of D1 is connected to the collector Q1 while the cathode of D2 is connected to the collector of Q2. The emitter of Q1 is connected to the negative terminal of source $E_2$, where the cathode of D3 is also connected. The emitter of Q2 is connected to the negative terminal X where the anode of D3 is also connected. The base of Q1 is connected to the emitter of Q2 and the base of Q2 is connected to the emitter of Q1.

The operation of the indicator circuit is as follows. Diode D3 is preferably a silicon rectifier having a barrier potential of about 0.7 volts. When all three battery cells are fully charged a trickle current of about 20 milliamperes (and no more than 30 milliamperes) continues to flow. The source voltage $E_2$ is then about 6.90 volts. The battery voltage $E_3$ is about 6.15 volts, and the voltage Ed across diode D3 is about 0.75 volts. In that circuit condition the base of Q1 is positively biased so that Q1 is conductive. Current therefore flows through R3, D1, and the collector-emitter path of Q1. Diode D1 is illuminated and indicates a "charge" condition as shown by the inscription in FIG. 2.

During heavy charging of the battery the condition of the indicator circuit is the same except that transistor Q1 is more strongly biased to a conductive state and diode D1 glows somewhat more brightly.

If the Power Supply is removed or de-energized, a different indication results. The indicator circuit is then operated by energy from battery $E_3$. The reverse impedance of D3 connected in a series loop with R1 and R2 causes the base of Q2 to become positively biased so that Q2 becomes conductive. Current then flows through R3 and D2 and hence through the collector-emitter path of Q2. Diode D2 is illuminated and thus indicates "power off" as shown by the inscription in FIG. 2.

If the flashlight switch SW is open, then neither of the lights D1, D2 will light. There is no positive circuit action to bias D3 in either direction. Both emitters are at essentially the same potential, and both transistors are biased to a non-conductive state.

Recommended operation of the device in recharging a flashlight is as follows. First, the flashlight is inserted into the recharger device so that the terminals of the flashlight circuit are connected to terminals X—X of the recharger circuit. Then the flashlight switch SW is turned on. The "Power Off" indicator will now light, indicating that mechanical contact has been made between the flashlight and the recharger circuit but that no separate source of power has been applied to the recharger unit. Thereafter, the Power Supply is connected between the appropriate source of energy and the recharger circuit. The "Power Off" indicator is now extinguished and the "charger" indicator will illuminate.

A particular advantage of the recharger circuit when used for recharging a flashlight is as follows. The charging indicator will not only show the charging action (if any) that is taking place, but in the event that the surroundings are dark it will also show where the flashlight is located. Particularly in the event of a power failure, the instant illumination of diode D2 not only shows "Power Off" but also makes it possible to immediately locate the flashlight. The Flashlight may then be detached from the recharging unit and is ready for usage.

While one form of the invention has been described in considerable detail in order to comply with the Patent Laws, it will be understood that the scope of the invention is to be limited only by the following claims.

We claim:

1. A battery recharger comprising:
   a regulated D.C. voltage source and a charge control diode coupled together to form a series circuit;
   means for coupling said series circuit in a series loop with a battery circuit such that the battery voltage opposes the voltage of said source; and
   indicator circuit means coupled across said charge control diode for indicating the charging condition, including both a "CHARGE" indicator light and a "POWER OFF" indicator light;
   said indicator circuit means being biased by said control diode when current from said voltage source flows through said series loop to cause said "CHARGE" indicator light to be energized and said "POWER OFF" indicator light to be deenergized; and
   said indicator circuit means being biased by said control diode when said voltage source is ineffective and current from said battery flows from said series loop to cause said "CHARGE" indicator light to be deenergized and said "POWER OFF" indicator light to be energized.

2. A battery recharger circuit comprising:
   a regulated D.C. voltage source and a charge control diode coupled together to form a series circuit;
   means for coupling said series circuit in a series loop with a battery such that the battery voltage opposes the voltage of said source; and
   indicator circuit means coupled across said charge control diode for indicating the charging condition, including both a "CHARGE" indicator light and a "POWER OFF" indicator light;
   said indicator circuit means including a pair of cross-coupled transistors having a common current limiter connected to one end of said series circuit, the other ends of the collector-emitter paths of said transistors being connected to respective terminals of said charge control diode; and said indicator circuit means further including a separate light emitting diode connected in series with each of said paths, said light emitting diodes respectively corresponding to said "CHARGE" indicator light and said "POWER OFF" indicator light.

3. A flashlight recharger circuit for recharging a flashlight that includes a battery, bulb, and an on-off switch coupled in a series loop, said recharger circuit comprising:
   a regulated DC voltage source;
   a charge control diode coupled to said source to form a series circuit;
   means for coupling said series circuit across the series loop of the flashlight so that the battery voltage opposes the source voltage;
   a pair of transistors, each having one end of its collector-emitter path connected to a respective terminal of said charge control diode, and the base of each transistor being connected to the emitter of the other;
   a pair of light-emitting diodes connected in series with the other ends of the collector-emitter paths of respective ones of said transistors; and
   a load device having one end connected to the end of said series circuit remote from said charge control diode, and its other end connected to both of said light-emitting diodes;
   said load device thereby serving as a common current limiter for both of said transistors, one of said transistors remaining conductive for illuminating its associated light-emitting diode so long as charging current flows into the flashlight battery, and the other of said transistors remaining conductive for energizing its associated light-emitting diode whenever said voltage source is de-energized.

* * * * *